Figure 1:
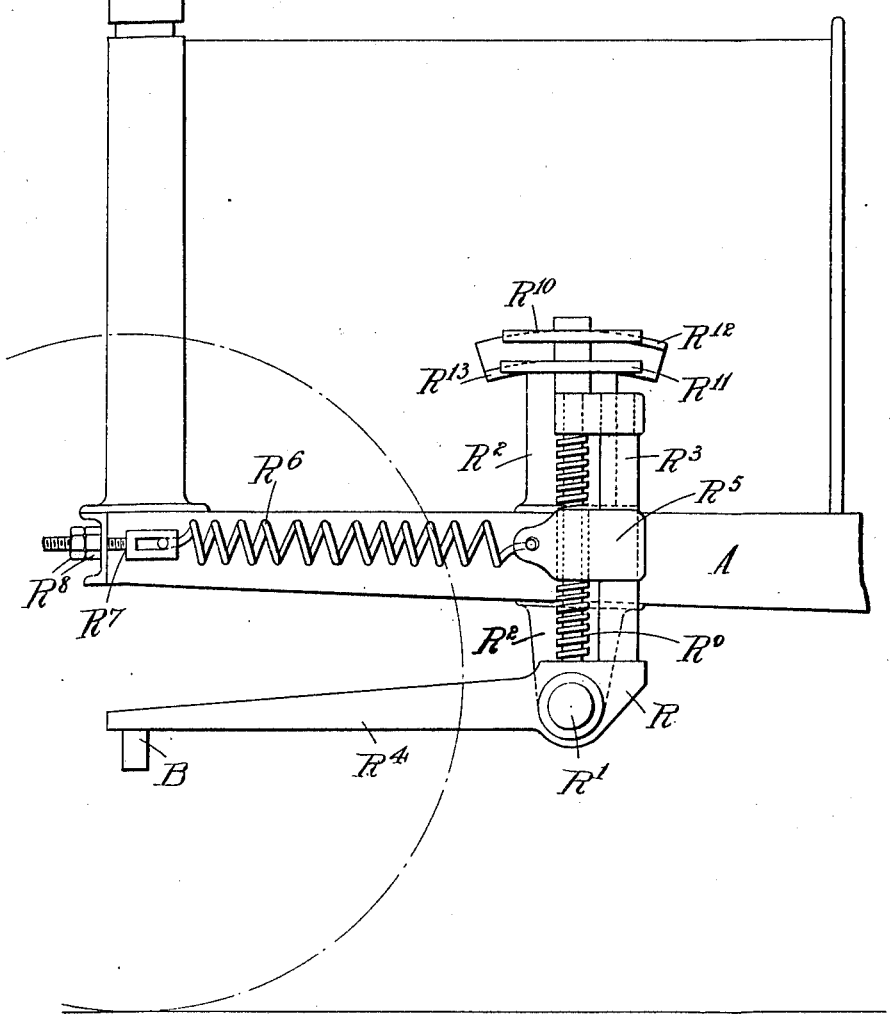

L. E. COWEY.
ROAD VEHICLE SUSPENSION ARRANGEMENT.
APPLICATION FILED OCT. 24, 1910.

1,020,385.

Patented Mar. 12, 1912.

2 SHEETS—SHEET 1.

L. E. COWEY.
ROAD VEHICLE SUSPENSION ARRANGEMENT.
APPLICATION FILED OCT. 24, 1910.

1,020,385.

Patented Mar. 12, 1912.
2 SHEETS—SHEET 2.

UNITED STATES PATENT OFFICE.

LEONARD EUGENE COWEY, OF KEW GARDENS, ENGLAND.

ROAD-VEHICLE SUSPENSION ARRANGEMENT.

1,020,385. Specification of Letters Patent. Patented Mar. 12, 1912.

Original application filed February 6, 1909, Serial No. 476,551. Divided and this application filed October 24, 1910. Serial No. 588,867.

*To all whom it may concern:*

Be it known that I, LEONARD EUGENE COWEY, a subject of the King of Great Britain, residing at Archer Works, Station avenue, Kew Gardens, in the county of Surrey, England, have invented certain new and useful Improvements Relating to Road-Vehicle Suspension Arrangements, of which the following is a specification.

This invention relates to the supporting of the bodies or frames of road vehicles in relation to their axles through the intervention of metallic or other mechanical springs. It has hitherto been proposed to so arrange such springs that they offer a practically constant resistance to relative movements of the vehicle frame and axles, whether such movements are caused by a varying load on the vehicle frame, or by vibratory or undulatory movements of the axles due to traveling over rough or uneven roads, and to provide hand operated means for varying the resistance offered by the springs.

The chief object of this invention is to construct the apparatus in such a manner that it will exert a practically constant resistance under the influence of the aforesaid vibratory or undulatory movements, and at the same time will be self-regulating as regards change or variation in the load on the vehicle.

According to this invention the frame or body of the vehicle is supported from the axles by self-regulating cushioning devices comprising metallic or other mechanical springs adapted to maintain such parts at an average distance from each other, any change (other than a momentary change) in the average distance between the frame and axle such as is occasioned for example by a variation in the load automatically causing the resistance of the cushioning device to be regulated to meet the said variation in the load and to restore the average distance between the frame and axle. For this purpose each axle may be connected to the horizontal arms of two bell crank levers, one of which is conveniently pivoted to each side member of the vehicle frame. The upright arm of each bell crank lever is provided with a sliding block or other suitable attachment connected by a long spring to any convenient part of the vehicle. The sliding block is capable of receiving movement in either direction upon its arm and may be actuated by means of a screw carried by such arm and provided on its upper end with two toothed or friction wheels fitted with ratchets adapted to engage with segmental racks or plates located at opposite sides of the upright arm when the latter is occupying its normal position.

In order that the said invention may be clearly understood and readily carried into effect I will describe the same more fully with reference to the accompanying drawing in which—

Figure 2:
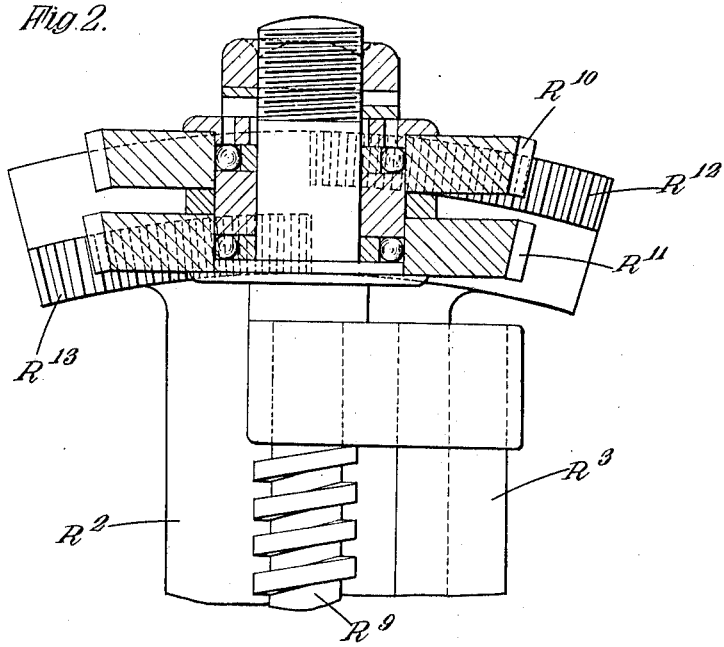
Figure 3:
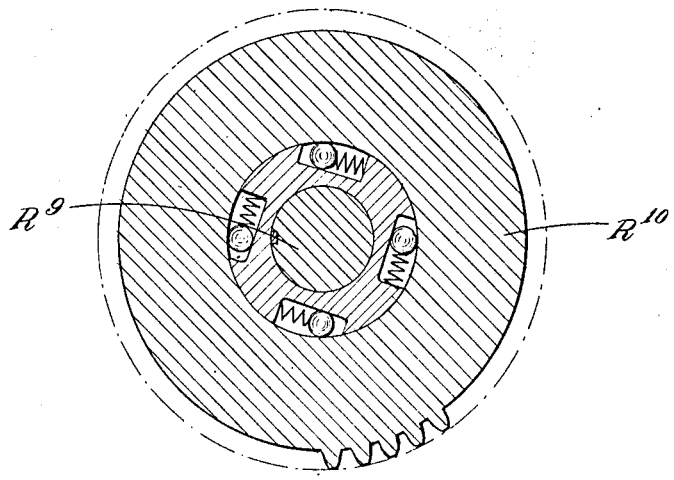

Figure 1 is a side elevation of part of a motor vehicle showing the invention applied thereto. Fig. 2 is a sectional elevation of part of Fig. 1 drawn to a larger scale, and Fig. 3 is a horizontal section of part of Fig. 2.

A represents the vehicle frame, B the wheel axle and R the bell crank lever.

The lever R is pivoted at R' to a bracket $R^2$ secured to its respective side member of the vehicle frame. The bell crank lever R is provided with an upright arm $R^3$ and an approximately horizontal arm $R^4$ the outer or free end of which is connected to the wheel axle B. Slidably mounted upon the upright arm $R^3$ of each bell crank lever is a nut $R^5$ connected by a long spring $R^6$ to any convenient part of the vehicle through the intervention of an adjustable arrangement comprising for example an eye-bolt $R^7$ and nuts $R^8$. The nut $R^5$ is capable of receiving movement in either direction upon its arm by means of a screw $R^9$ which passes through such nut and is rotatably carried by such arm and provided at its upper end with two toothed or friction wheels $R^{10}$ $R^{11}$ adapted to engage with stationary segmental racks or friction plates $R^{12}$ $R^{13}$ respectively, the said plates being carried by the bracket $R^2$ and adapted to occupy a position at opposite sides of the upright screw $R^9$ when the latter is in its normal position. Each of the toothed or friction wheels $R^{10}$, $R^{11}$ is mounted upon the screw $R^9$ through the intervention of a suitable ratchet. In the examples shown in Figs. 2 and 3 a well known type of ball ratchet is employed, each ratchet being so arranged that each toothed or friction wheel is only capable of rotating the screw $R^9$ in a direction opposite to that in which the other wheel is capable of rotating it.

When the load on the car is increased the frame of the vehicle moves relatively to the axle B and at the same time the arm $R^3$ of the bell crank lever rotates about its center $R'$ thus bringing the toothed or friction wheel $R^{10}$ into engagement with the rack or plate $R^{12}$. The wheel $R^{10}$ has imparted to it a reciprocating motion about the center $R'$ due to the wheel of the vehicle running over an uneven surface. The ratchet connected with the wheel $R^{10}$ only permits of its turning the screw $R^9$ in one direction. As a result of this turning movement the screw raises the nut $R^5$ thus giving the spring $R^6$ a greater leverage over the bell crank lever whereby the parts are gradually caused to resume their normal position. When the load on the car is decreased the bell crank lever rotates about its center in the opposite direction and brings the toothed or friction wheel $R^{11}$ into contact with its corresponding rack or plate $R^{13}$ whereupon the nut $R^5$ is moved in the opposite direction to that previously described. Thus cumulative movements on either side of the mean position, due to road or other irregularities, return the parts in either direction to the mean position.

By employing a long spring the short amount of additional extension imparted thereto by the movement of the axle when the wheel at that end is passing for example over a stone, does not increase the resistance offered by the spring to any material extent and the wheel and its axle will be lifted without imparting a corresponding movement to the vehicle frame.

It is to be understood that the aforesaid expression practically constant resistance is used by me in comparison with the resistance possessed by ordinary springs as usually fitted to motor road vehicles and in which the variations in resistance due to the vibratory or undulatory movements of the wheel axles are very considerable.

What I claim and desire to secure by Letters Patent of the United States is:—

1. In a road vehicle suspension arrangement, the combination with the wheel axle and the vehicle frame, of a frame supporting lever interposed between the frame and the axle, a spring attached to the lever and means controlled by the relative movements of the frame and axle for moving the point of attachment of the spring along the lever to and from the fulcrum.

2. In a road vehicle suspension arrangement, the combination with the wheel axle and the vehicle frame, of a spring supporting the frame, a device for varying the supporting power of the said spring in either direction about a mean position, means for controlling the said varying device having two members adapted to move unidirectionally, and connections from the said members to the vehicle frame adapted to operate them one at a time by relative movements of the frame and axle on either side of a mean position.

3. In a road vehicle suspension arrangement, the combination with the wheel axle and the vehicle frame of a bell crank lever pivoted to the vehicle frame and having one arm connected to the axle, a member slidably mounted on the other arm, a spring connected to such member and to the vehicle frame and means for automatically varying the position of the member on the bell crank lever arm.

4. In a road vehicle suspension arrangement, the combination with the wheel axle and the vehicle frame of a spring connected to the vehicle frame, a bell crank lever pivoted to the vehicle frame and having one arm connected to the axle, a nut slidably mounted upon the other arm of the bell crank lever and connected to the spring, a screw passing through such nut and rotatably carried by the said arm, and gearing actuated by relative movements of the axle and vehicle frame for rotating the screw in either direction.

5. In a road vehicle suspension arrangement, the combination with the wheel axle and the vehicle frame, of a spring connected to the vehicle frame, a bell crank lever pivoted to the vehicle frame and having one arm connected to the axle, a nut slidably mounted upon the other arm of the bell crank lever and connected to the spring, a screw spindle passing through such nut and rotatably carried by the said arm, two gear wheels mounted on the said screw spindle and adapted to turn it singly in opposite directions, and two fixed racks on the vehicle frame, concentric with the lever pivot and adapted to engage the said gear wheels alternately on either side of the mean position.

In testimony whereof I affix my signature in presence of two witnesses.

LEONARD EUGENE COWEY.

Witnesses:
T. SELLEY WORDLE,
W. J. SKERTEN.